(12) United States Patent
Ho (10) Patent No.: US 8,000,034 B2
(45) Date of Patent: Aug. 16, 2011

(54) TOTAL-REFLECTION LENS

(76) Inventor: Yen-Wei Ho, Taichung (TW)

( * ) Notice: Subject to any disclaimer, the term of this patent is extended or adjusted under 35 U.S.C. 154(b) by 259 days.

(21) Appl. No.: 12/155,415

(22) Filed: Jun. 4, 2008

(65) Prior Publication Data

US 2009/0225440 A1    Sep. 10, 2009

(30) Foreign Application Priority Data

Mar. 5, 2008   (TW) .............................. 97107580 A (51) Int. Cl.
*G02B 17/00*   (2006.01)
(52) U.S. Cl. ......... 359/727; 359/726; 359/642; 359/800
(58) Field of Classification Search .......... 359/726–728, 359/800
See application file for complete search history.

(56) References Cited

U.S. PATENT DOCUMENTS

| | | | | | |
|---|---|---|---|---|---|
| 4,865,456 | A | * | 9/1989 | Mast et al. | 356/446 |
| 5,343,330 | A | * | 8/1994 | Hoffman et al. | 359/708 |
| 7,224,537 | B2 | * | 5/2007 | Choi | 359/707 |
| 7,554,742 | B2 | * | 6/2009 | Chinniah et al. | 359/641 |
| 7,572,654 | B2 | * | 8/2009 | Chang | 438/29 |
| 7,602,559 | B2 | * | 10/2009 | Jang et al. | 359/726 |

\* cited by examiner

*Primary Examiner* — Jordan M. Schwartz (57) ABSTRACT

This invention is regarding to an innovatively designed lens that employs two holes of different shapes as light-inlet and light-outlet surfaces to direct lights. The main feature is that the light can emit out at a more focused and uniformed fashion through refraction and total reflection. On the other hands, the lens also has grooves set to allow for side lighting purposes when needed. And with the grooves, the light can emit at a wide range when multiple such lens are properly assembled.

3 Claims, 11 Drawing Sheets

TOTAL-REFLECTION LENS

BACKGROUND OF THE INVENTION

This invention is regarding to an innovatively designed lens that can utilize the light from light source efficiently, enlarge lighting range, and enhance lighting brightness and uniformity.

In the prior art as Taiwan Patent M275418 "Lens with capability of uniforming lights", it comprises light-inlet and light-outlet surfaces, and they are on both sides of the lens respectively. The light-inlet surface is convex, and there are multiple small light-uniformity-enhancing lens on the light-outlet surface. The light first refracts through the light-inlet surface, and then emit out with uniform brightness and hue through the multiple light-uniformity-enhancing lens. The aforementioned is a solid lens whose both surfaces have different curveness so for light to refract to have both focusing and scattering effects to have uniform brightness and hue.

However, the lens is a solid one, and it would hinder the heat-spread, and cause problem when cooperating with lights (even if it is power-saving LED) for a long period of time, which would seriously impact the life of the light source.

BRIEF SUMMARY OF THE INVENTION

This invention is to offer a total-reflection lens that can effectively focus lights from a light source (LED) to greatly enhance the lighting efficiency, brightness and uniformity. To reach aforementioned purpose, the proposed total-reflection lens is a transparent cone-shaped body whose diameter gets wider from its bottom towards top. Further, axially it has a cylinder hole at bottom, and a cone-shaped hole (diameter gets wider towards its top surface.) on top. Accordingly, when a light source is placed in the cylinder hole, the light can be focused well through the total-reflection lens, reaching the purposes of enhancing lighting efficiency, heat spread and the life of light. Moreover, one or multiple grooves can be facilitated on top of the lens at its cone-shaped hole so for the light source to emit side lights, which enables wider lighting angle and higher lighting efficiency when multiple lens assembly together.

DETAILED DESCRIPTION OF THE INVENTION

Figure 1:
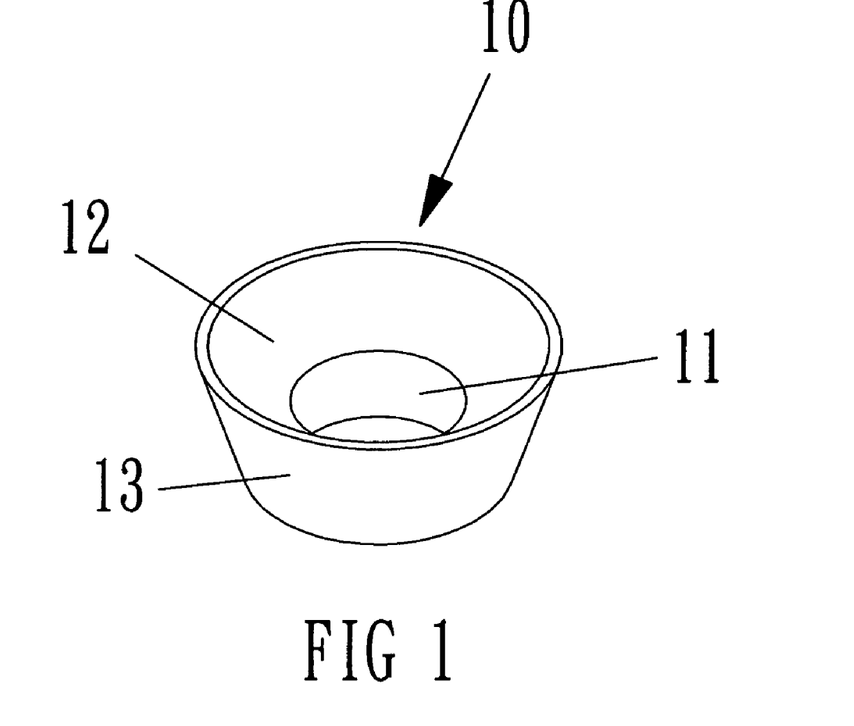
FIG. 1—a perspective view of the 1$^{st}$ preferred embodiment
Figure 2:
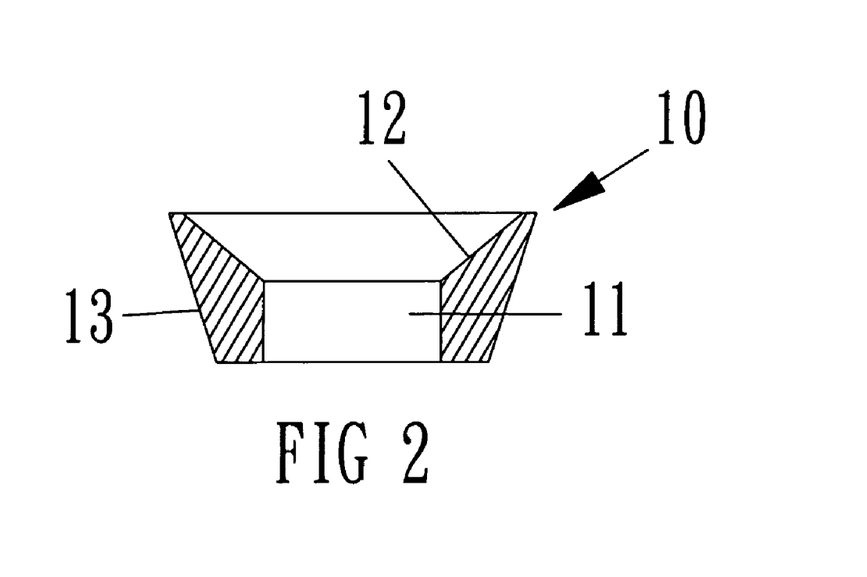
FIG. 2—a sectional view of the 1$^{st}$ preferred embodiment

Below is a detailed description of a preferred embodiment. First, with reference to FIG. 1-3, the proposed total-reflection lens is a transparent cone-shaped body 10 with diameter getting wider from its bottom towards top. Further, axially the transparent cone-shaped body 10 has a cylinder hole 11 at bottom, and a cone-shaped hole 12 (diameter gets wider towards its top surface.) on top with the cylinder hole 11 and cone-shaped hole 12 connecting to each other. The cylinder hole 11 serves as the inlet surface for light source, while the cone-shaped hole 12 as the outlet surface for light source. The aforementioned are the main features of this invention accordingly. The best angle between the cylinder hole 11 and the cone-shaped hole 12 is around 130 degrees. On the other hand, the surface of cone-shaped hole 12 can be also concaved (ex: replaced with a bowl-shaped hole 14 as shown in FIG. 2) or convex.

Figure 3:
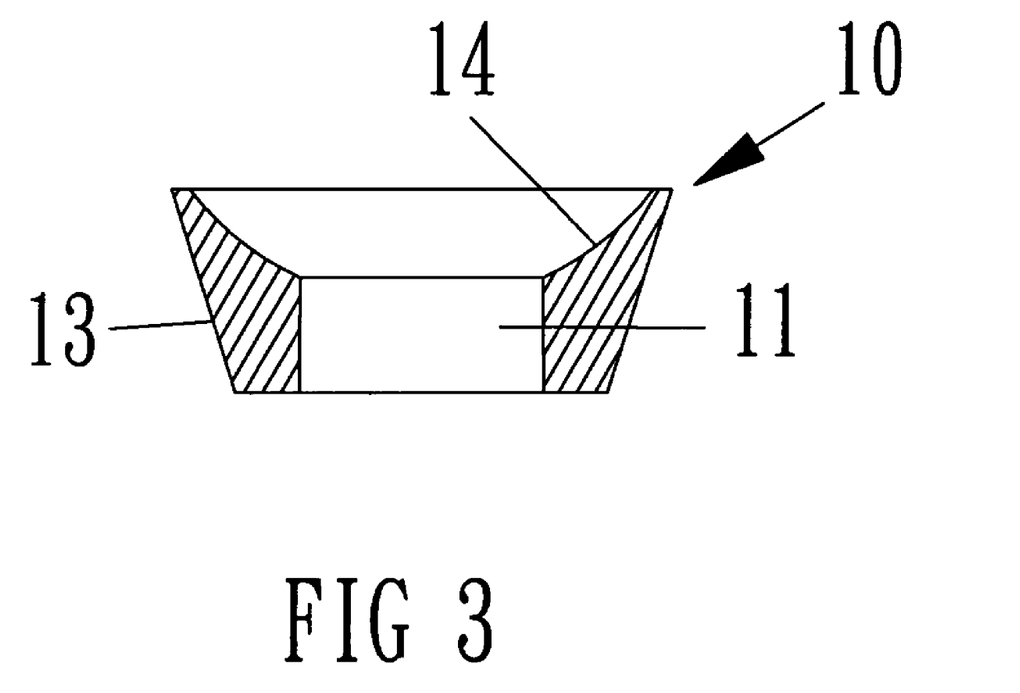
FIG. 3—a sectional view of the 1$^{st}$ preferred embodiment with extended illustration FIG. 4—a perspective view of the 1$^{st}$ preferred embodiment in a position of use.

When a light source 20 (could be LED) is placed in the cylinder hole 11, the central light can emit out through the cylinder hole 11 and the cone-shaped hole 12 directly, while the side light first gets refracted through surface of the cylinder hole 11, secondly totally reflected by the outer surface of the cone-shaped body 13, and then emit out through the surface of the cone-shaped hole 12. Accordingly, it reaches the purposes of enhancing lighting utilization efficiency and uniformity.

Figure 4:
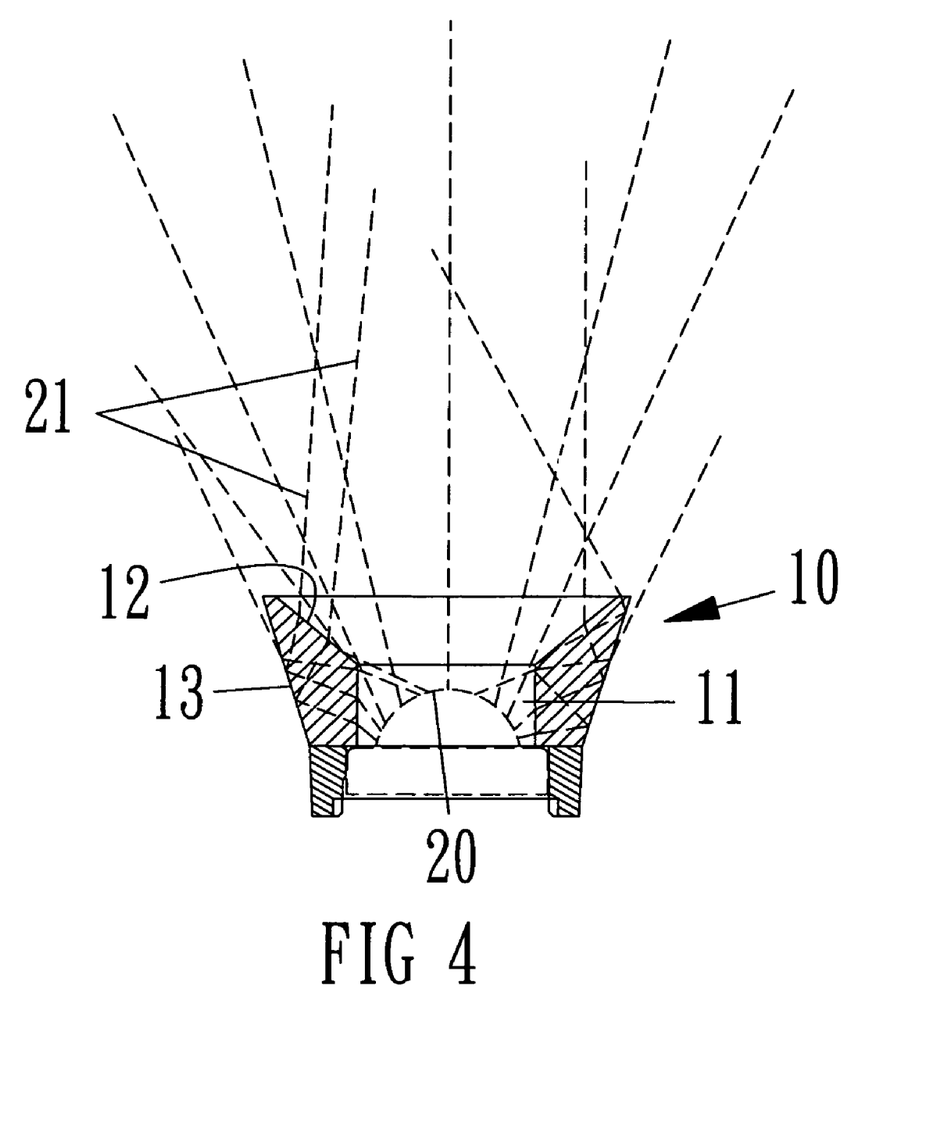
Figure 5:
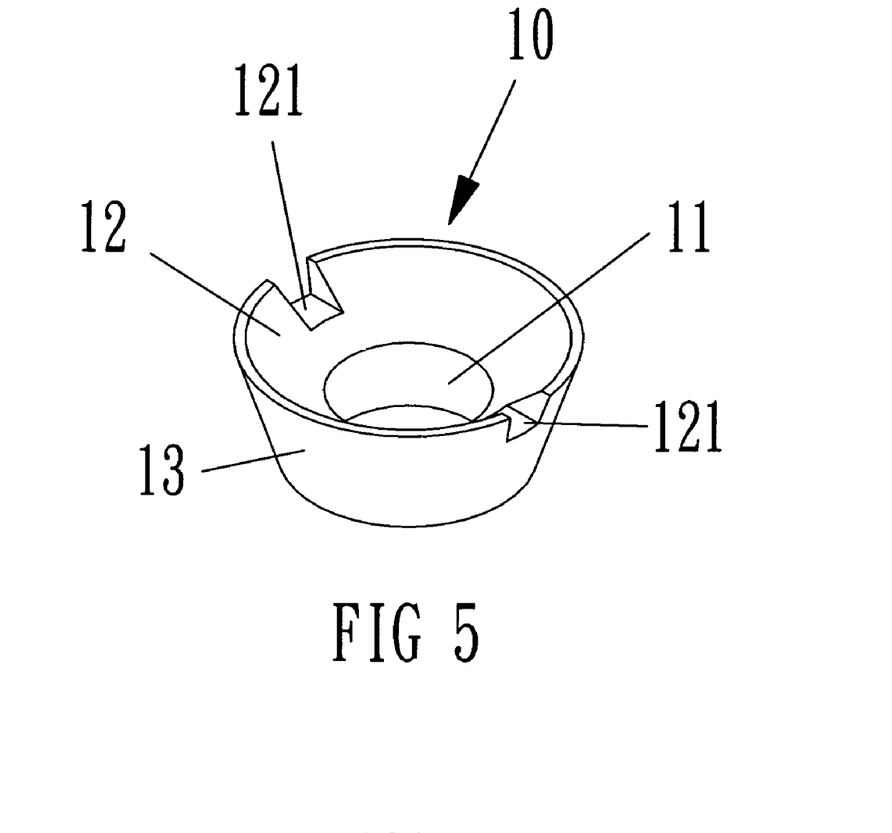
FIG. 5—a perspective view of the 2$^{nd}$ preferred embodiment
Figure 6:
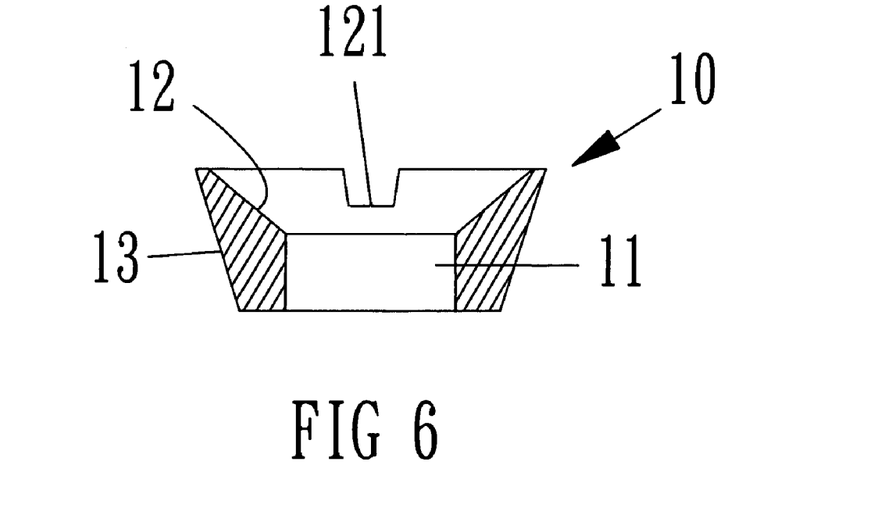
FIG. 6—a sectional view of the 2$^{nd}$ preferred embodiment
Figure 7:
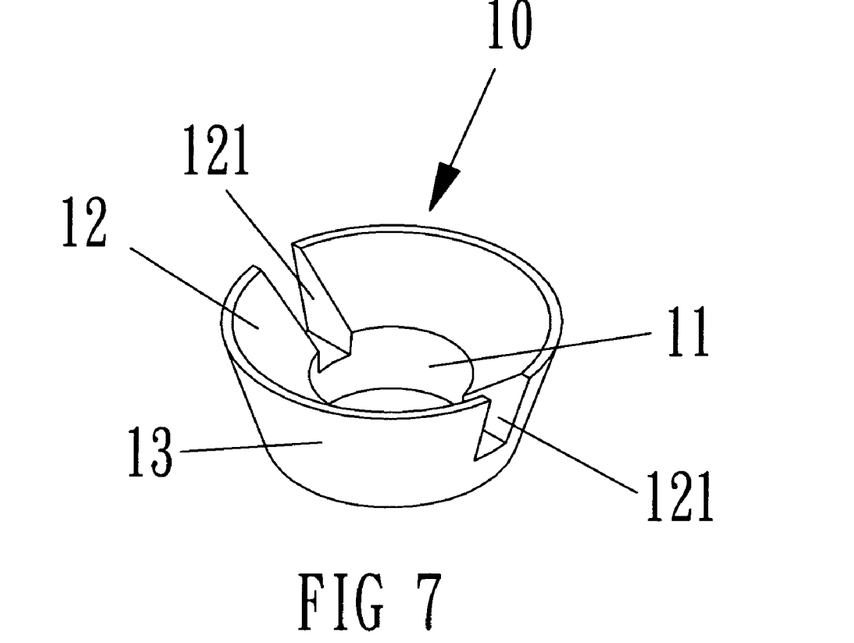
FIG. 7—a perspective view of the 3$^{rd}$ preferred embodiment
Figure 8:
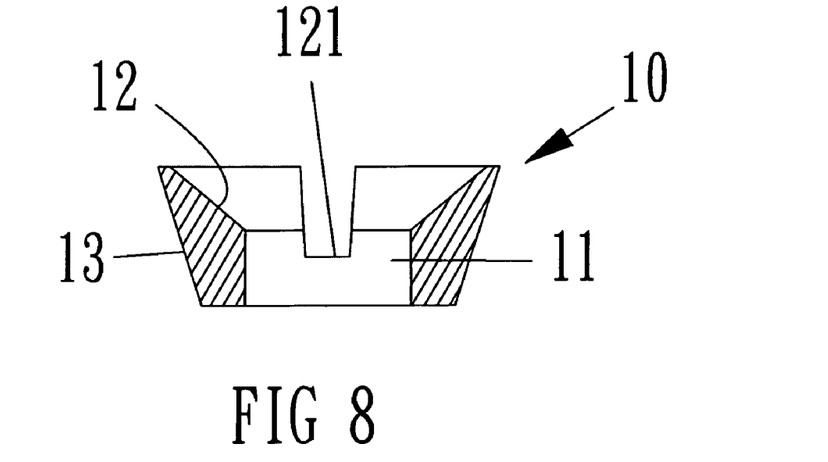
FIG. 8—a sectional view of the 3$^{rd}$ preferred embodiment
Figure 9:
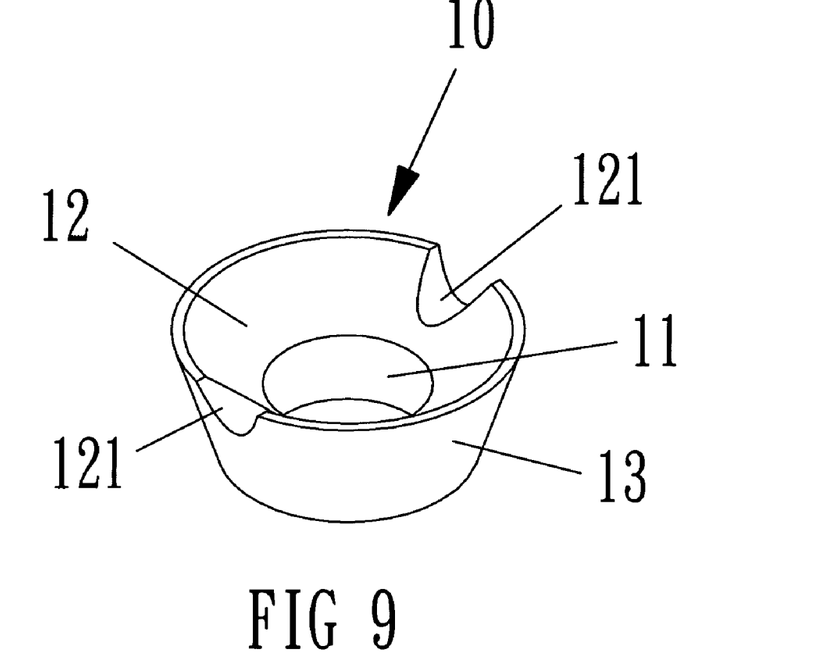
FIG. 9—a perspective view of the 4$^{th}$ preferred embodiment
Figure 10:
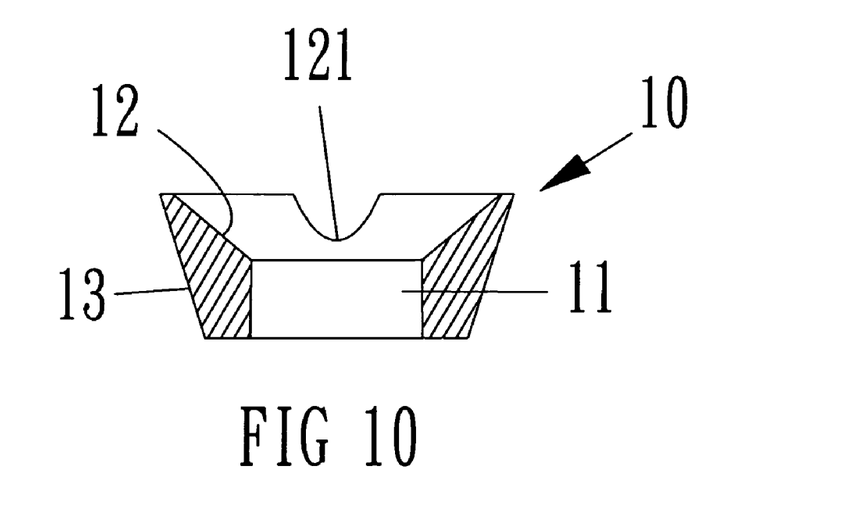
FIG. 10—a sectional view of the 4$^{th}$ preferred embodiment
Figure 11:
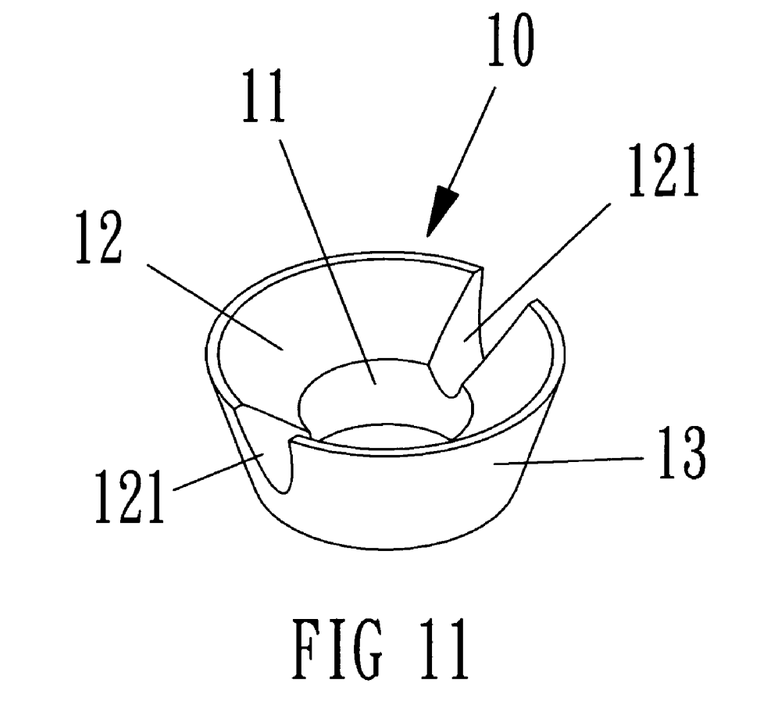
FIG. 11—a perspective view of the 5$^{th}$ preferred embodiment
Figure 12:
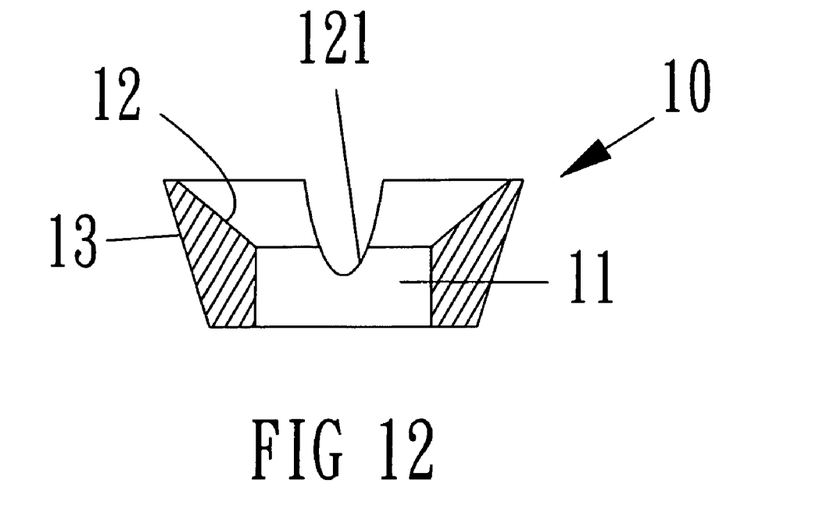
FIG. 12—a sectional view of the 5$^{th}$ preferred embodiment
Figure 13:
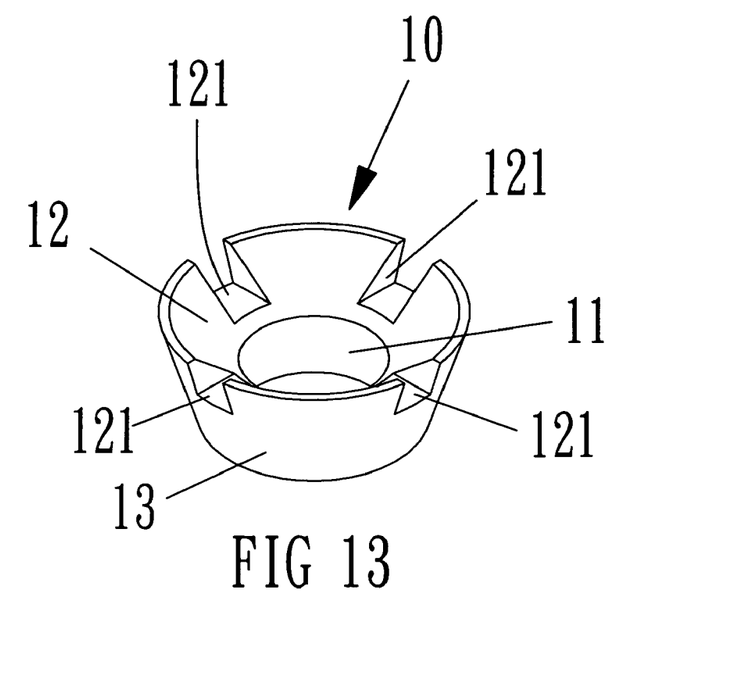
FIG. 13—a perspective view of the 6$^{th}$ preferred embodiment
Figure 14:
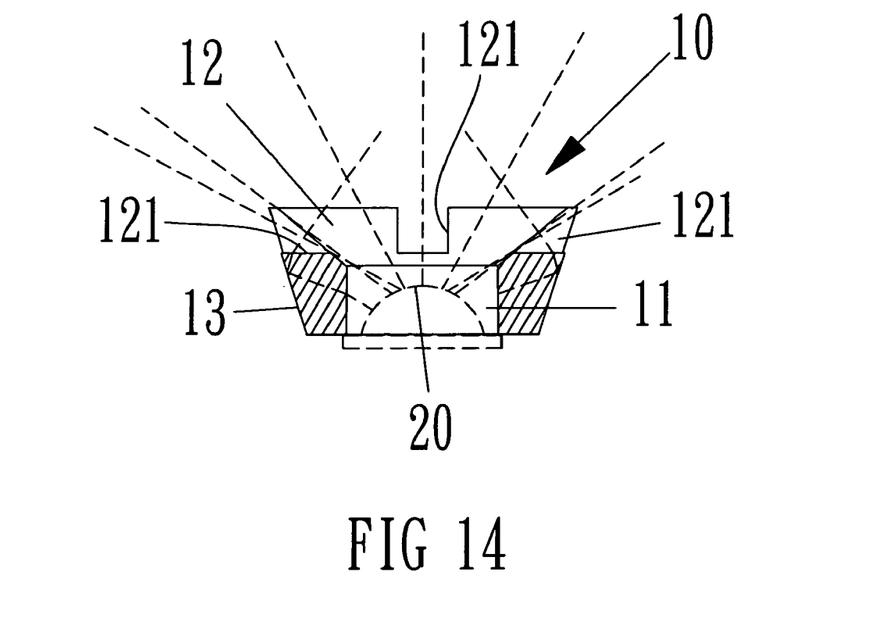
FIG. 14—a sectional view of the 6$^{th}$ preferred embodiment
Figure 15:
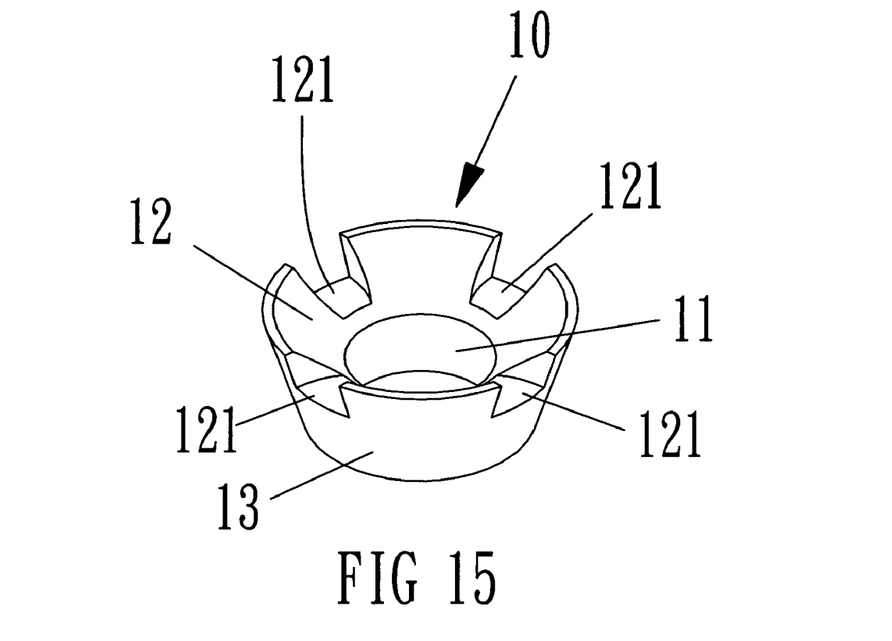
FIG. 15—a perspective view of the 7$^{th}$ preferred embodiment
Figure 16:
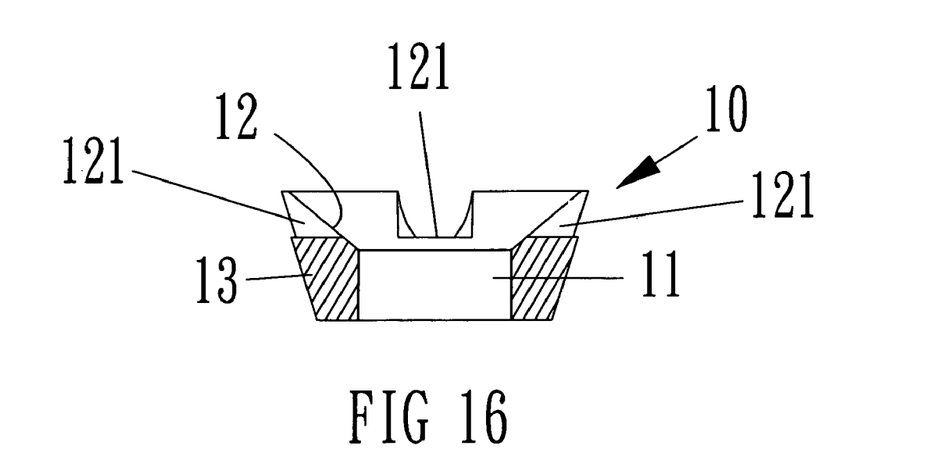
FIG. 16—a sectional view of the 7$^{th}$ preferred embodiment
Figure 17:
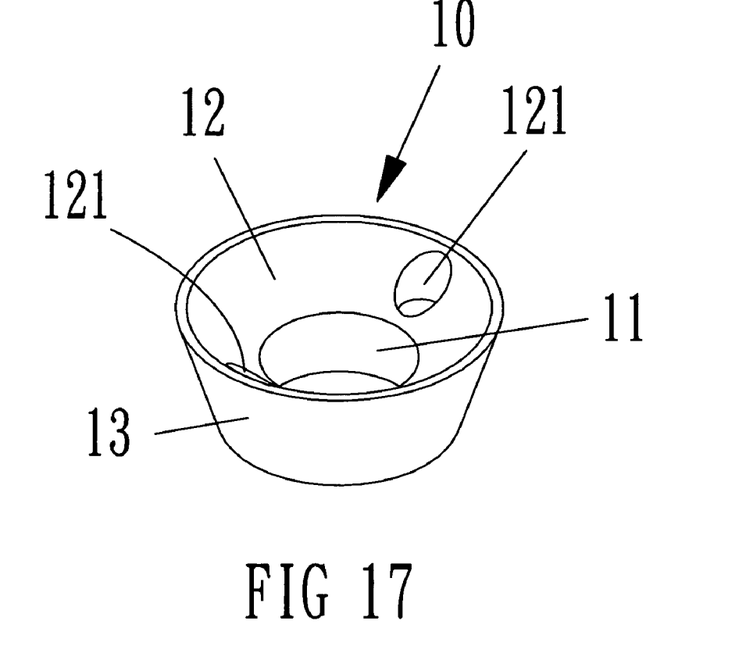
FIG. 17—a perspective view of the 8$^{th}$ preferred embodiment
Figure 18:
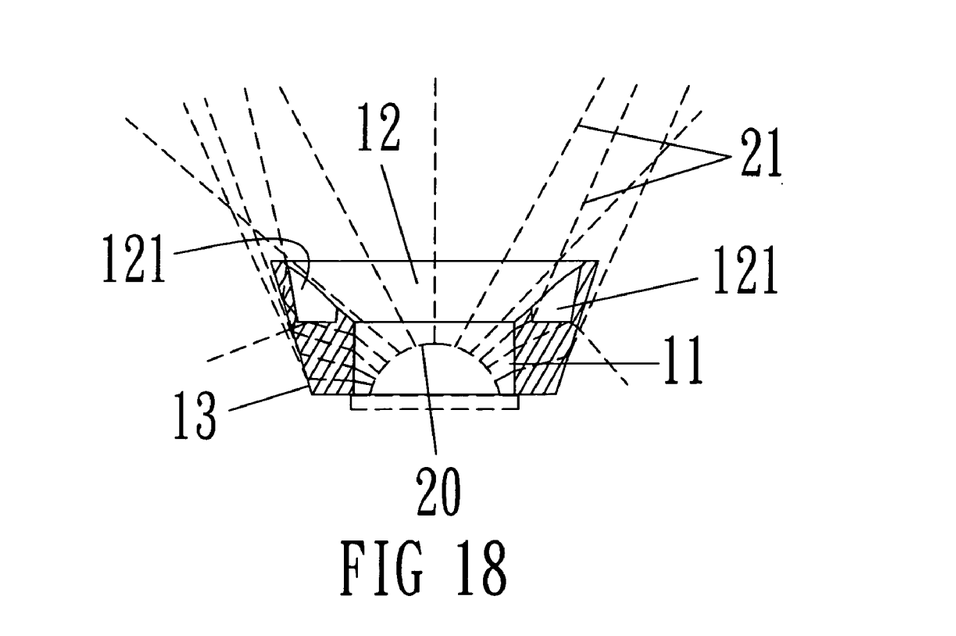
FIG. 18—a sectional view of the 8$^{th}$ preferred embodiment
Figure 19:
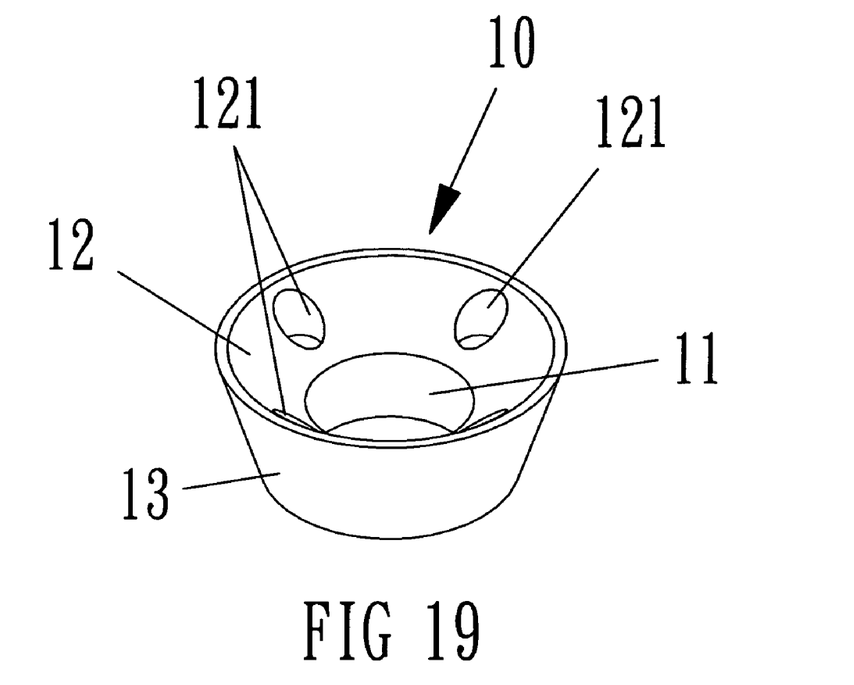
FIG. 19—a perspective view of the 9$^{th}$ preferred embodiment
Figure 20:
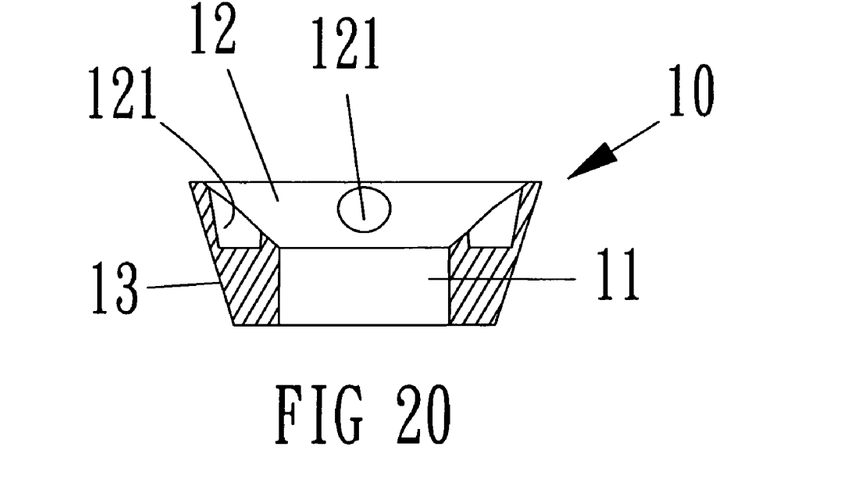
FIG. 20—a sectional view of the 9$^{th}$ preferred embodiment

Further for equivalent technical extensions of the preferred embodiments as shown in FIGS. 4 to 11, there can be symmetrical grooves 121 lying across between surface of the cone-shaped hole 12 and outer surface of the cone-shaped body 10, so as for the light source 20 to partially emit out through for side lighting purpose. About the grooves 121, they can be ⊔-shaped (as shown in FIGS. 4 and 5), and they can be as deep as to reach the cylinder hole 11 (as shown in FIGS. 7 and 8). Moreover, the grooves 121 can be also U-shaped (as shown in FIGS. 9 and 10), and they can be as deep as to reach the cylinder hole 11 (as shown in FIGS. 11 and 12).

Furthermore, as shown in FIG. 12-15, multiple grooves 121 can be facilitated equally-spaced. The Figures just exemplify 4 grooves, but any number of grooves should be covered and protected in the scope of claims of this invention. On the other hand, as shown in FIG. 16-19, the grooves 121 can be cylinder-shaped concaves and symmetrically facilitated so as to enhance the variety of lighting ranges and patterns.

With all aforementioned, the invention deserves grant of a patent based on its capability of industrial application and absolute novelty. The example illustrated above is just an exemplary embodiment for the invention, and shall not be utilized to confine the scope of the patent. Any equivalent modifications within the scope of claims of the patent shall be covered in the protection for this patent.

What is claimed is:

1. The total-reflection lens that is a transparent cone-shaped body with main feature of having a cylinder hole axially, wherein a cone-shaped hole is on top with the cylinder hole, and a diameter of the cone-shaped hole is wider toward a top surface of the cone-shaped hole, and at least one groove is on top of the cylinder hole, and the groove is a ⊔-shaped, an U-shaped or a cylinder-shaped concave, and2 the groove is as deep as to reach the cylinder hole, and a light source is placed in the cylinder hole.

2. The total-reflection lens of claim 1, wherein the groove is a cylinder-shaped concave that is further arranged between a top edge of the transparent cone-shaped body and the cylinder hole.

3. The total-reflection lens that is a transparent cone-shaped body with main feature of having a cylinder hole axially, wherein a light source is placed in the cylinder hole, and at least one groove is on top of the cylinder hole, and the groove is a cylinder-shaped concave further having a circular bottom, and a diameter of the circular bottom is smaller than the cylinder-shaped concave, and side light emitted by the light source firstly passes through the transparent cone-shaped body, and the side light is secondly refracted or reflected by the circular bottom of the cylinder-shaped concave.

* * * * *